US012617317B1

(12) United States Patent
Cannon et al.

(10) Patent No.: US 12,617,317 B1
(45) Date of Patent: May 5, 2026

(54) ARTICLE WITH SHAPESHIFTING SURFACE

(71) Applicant: International Automotive Components Group NA, Inc., Southfield, MI (US)

(72) Inventors: Carter Scott Cannon, Munich (DE); Sung-up Kim, Grafing (DE); Alexander H. Green, Whitmore Lake, MI (US)

(73) Assignee: International Automotive Components Group NA, Inc., Southfield, MI (US)

( * ) Notice: Subject to any disclaimer, the term of this patent is extended or adjusted under 35 U.S.C. 154(b) by 0 days.

(21) Appl. No.: 18/668,891

(22) Filed: May 20, 2024

Related U.S. Application Data

(60) Provisional application No. 63/503,275, filed on May 19, 2023.

(51) Int. Cl.
B60N 2/02 (2006.01)

(52) U.S. Cl.
CPC ......... B60N 2/0229 (2023.08); B60N 2/0231 (2023.08); B60N 2/0233 (2023.08)

(58) Field of Classification Search
CPC ... B60N 2/0231; B60N 2/0229; B60N 2/0233
See application file for complete search history.

(56) References Cited

U.S. PATENT DOCUMENTS

| | | | |
|---|---|---|---|
| 7,252,313 B2 | 8/2007 | Browne et al. | |
| 7,858,891 B2 | 12/2010 | Strohband et al. | |
| 8,547,339 B2 | 10/2013 | Ciesla | |
| 8,570,295 B2 | 10/2013 | Ciesla et al. | |
| 8,780,060 B2 | 7/2014 | Maschmeyer et al. | |
| 8,836,643 B2 | 9/2014 | Romera Joliff et al. | |
| 8,922,510 B2 | 12/2014 | Ciesla et al. | |
| 8,954,848 B2 | 2/2015 | Scheufler et al. | |
| 9,079,498 B2 | 7/2015 | Small et al. | |
| 9,529,499 B2 | 12/2016 | Scheufler et al. | |
| 9,760,175 B2 | 9/2017 | Scheufler et al. | |
| 9,977,498 B2 | 5/2018 | Maschmeyer et al. | |
| 10,126,928 B2 | 11/2018 | Gibson | |
| 10,479,478 B2 | 11/2019 | Hussain et al. | |
| 10,485,094 B1 | 11/2019 | Isohätälä et al. | |
| 10,795,519 B2 | 10/2020 | Salandre et al. | |
| 2009/0002328 A1 | 1/2009 | Ullrich et al. | |
| 2011/0164063 A1* | 7/2011 | Shimotani | G06F 3/04886 |
| | | | 345/676 |
| 2012/0050200 A1 | 3/2012 | Vartanian et al. | |
| 2012/0105333 A1 | 5/2012 | Maschmeyer et al. | |

(Continued)

FOREIGN PATENT DOCUMENTS

| | | |
|---|---|---|
| CN | 113260527 A | 8/2021 |
| DE | 102019200090 A1 | 7/2020 |

(Continued)

*Primary Examiner* — Muhammad N Edun
(74) *Attorney, Agent, or Firm* — Secant IP, P.L.L.C.; Michael J. Gallagher

(57) ABSTRACT

An article and method to provide vehicle interior panels that offer control of vehicle systems where the control features visually present themselves to the occupant when a given control is desired or in need. The method includes the use of proximity sensors and a shapeshifting (morphing) surface.

22 Claims, 12 Drawing Sheets

(56)            References Cited

U.S. PATENT DOCUMENTS

| | | |
|---|---|---|
| 2014/0160044 A1 | 6/2014 | Yairi et al. |
| 2014/0320276 A1 | 10/2014 | Maschmeyer et al. |
| 2015/0077398 A1 | 3/2015 | Yairi et al. |
| 2020/0086881 A1 | 3/2020 | Abendroth et al. |
| 2020/0139814 A1* | 5/2020 | Galan Garcia ......... B32B 5/028 |
| 2021/0107400 A1* | 4/2021 | Erler ...................... B60Q 3/217 |
| 2021/0170958 A1 | 6/2021 | Brown et al. |

FOREIGN PATENT DOCUMENTS

| | | | |
|---|---|---|---|
| EP | 2503438 | A2 | 9/2012 |
| EP | 3851325 | B1 | 1/2023 |
| EP | 3908475 | B1 | 3/2023 |
| WO | 2011161310 | A1 | 12/2011 |
| WO | 2017044200 | A1 | 3/2017 |
| WO | 20201446016 | A1 | 7/2020 |
| WO | 2023011770 | A1 | 2/2023 |

* cited by examiner

100

110

92

100

110

92

100

100

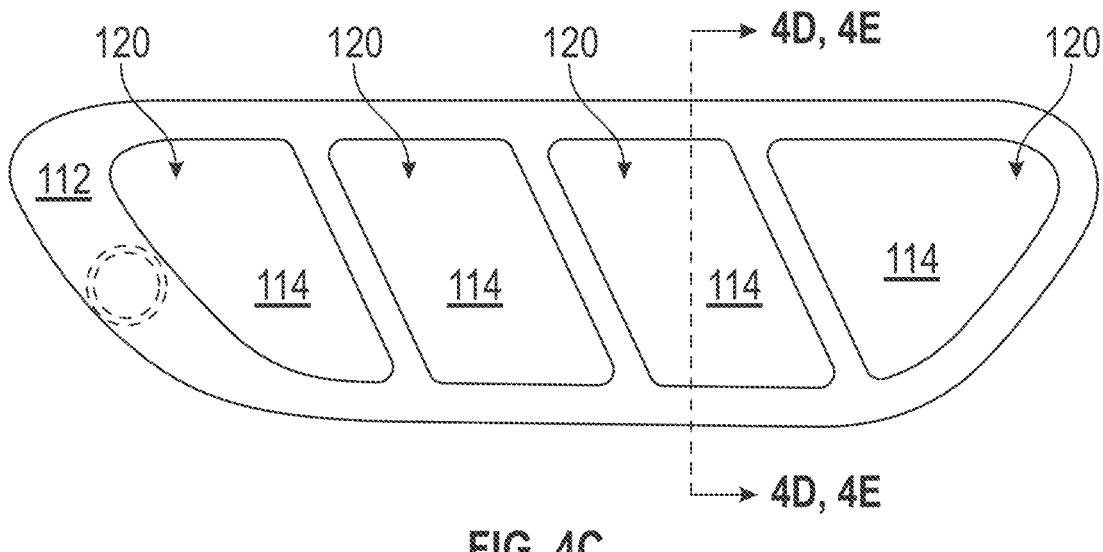
FIG. 4C
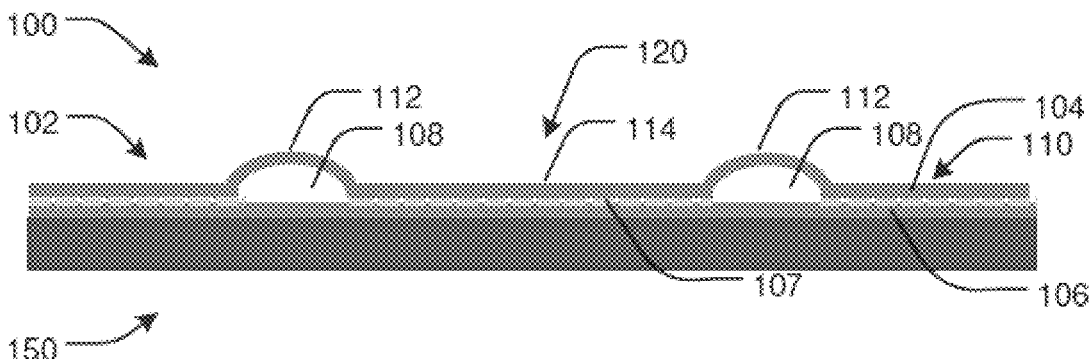
FIG. 4D
FIG. 4E

ARTICLE WITH SHAPESHIFTING SURFACE

CROSS REFERENCE TO RELATED APPLICATIONS

This non-provisional patent application claims the benefit of the filing date of U.S. provisional patent application Ser. No. 63/503,275, filed May 19, 2023, the entire disclosure of which is incorporated herein by reference.

TECHNICAL FIELD

An article with a shapeshifting (morphing) surface, and more particularly an automotive article, such as an automotive interior trim article, with a shapeshifting (morphing) surface where control features only visually present themselves to a vehicle occupant when a given control is desired.

BACKGROUND

Vehicle interior panels now typically employ some amount of touch-sensitive controls. These controls have replaced mechanical type configurations. The controls are directed to a variety of vehicle systems, such as vehicle operations, HVAC systems, navigation, audio systems, etc.

There nonetheless remains a desire to provide vehicle interior panels that provide control of vehicle systems, where the control features themselves may only visually present themselves to the vehicle occupant when a given control is desired or in need. The control system then would also desirably return to a configuration on the vehicle panel where it is in effect no longer visible, after operation by the user or within a certain period of prescribed time after use.

SUMMARY

A method of operating an interior article of a motor vehicle, comprising providing the article, the article having an outer surface including at least one shifting surface region and at least one non-shifting surface region adjacent the shifting surface region, the article having at least one proximity sensor configured to detect an object within a sensing distance of the outer surface, the article having at least one controller operable to operate at least one operational function of the vehicle by an occupant of the vehicle, the controller disposed beneath the outer surface and activatable by the vehicle occupant upon the vehicle occupant touching the outer surface of the article. The article is arrangeable in a first positional arrangement of the shifting surface region and the non-shifting surface region relative to each other such that the outer surface of the article has a first shape concealing a location of the controller from the vehicle occupant. The article is also arrangeable in a second positional arrangement of the shifting surface region and the non-shifting surface region relative to each other such that the outer surface of the article has a second shape revealing the location of the controller to the vehicle occupant. The method includes moving the shifting surface region relative to the non-shifting surface region from the first positional arrangement concealing the location of the controller from the vehicle occupant to the second positional arrangement revealing the location of the controller to the vehicle occupant, in response to the proximity sensor detecting the object within the sensing distance of the outer surface.

FIGURES

Various aspects and features of the present disclosure will be better understood by reading the following detailed description, taken together with the drawings wherein.

Figure 1A:
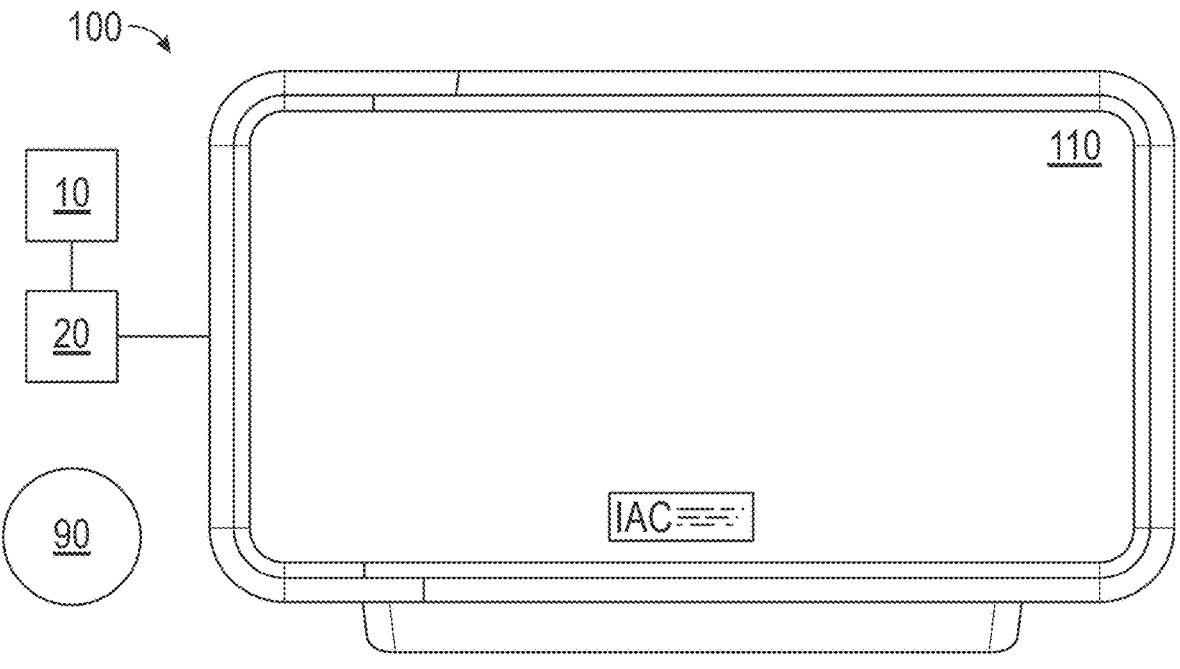
FIG. 1A is front plan view of an article according to the present disclosure with a (hybrid) shape/contour of the outer surface concealing the location of controller(s) for operation of the motor vehicle, such that the location of the controller(s) is/are concealed/hidden or otherwise invisible to an occupant of the vehicle.
Figure 1B:
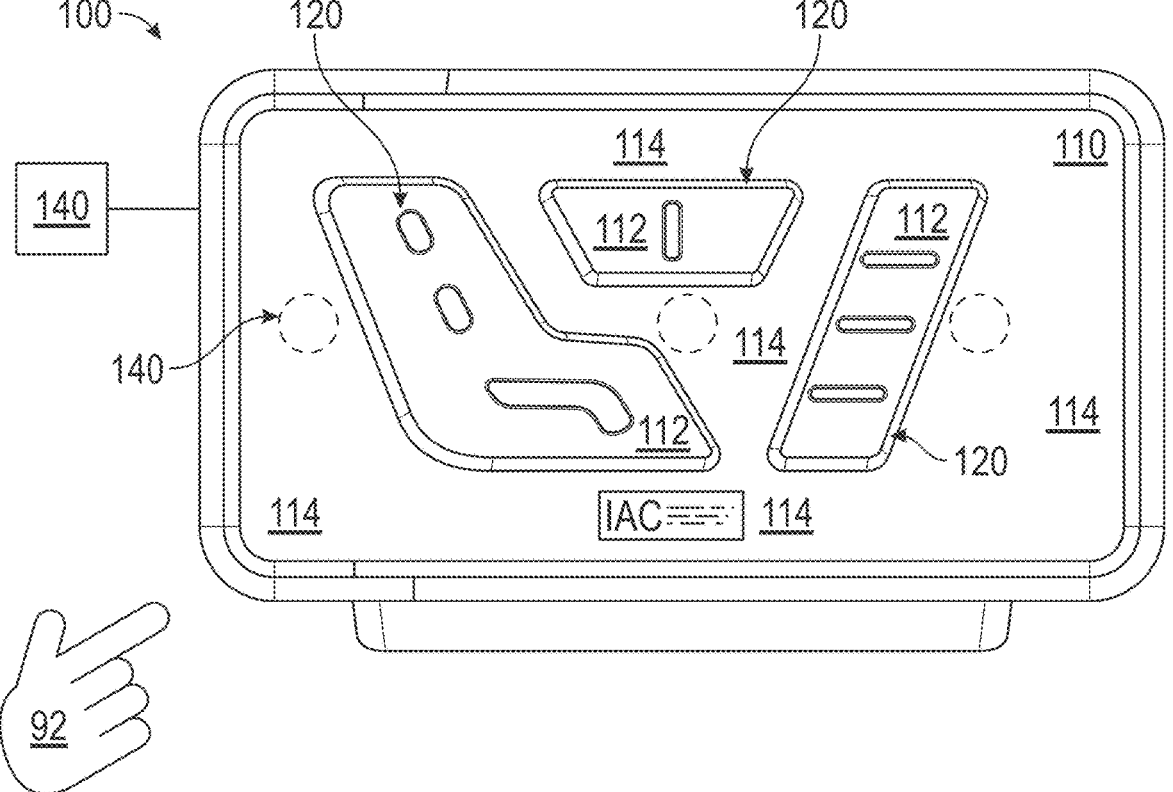
FIG. 1B is front plan view of an article according to the present disclosure with a (hybrid) shape/contour of the outer surface revealing the location of controller(s) operation of the motor vehicle, such that the location of the controller(s) is/are revealed/exposed or otherwise visible tacitly and visually to the occupant of the vehicle.
Figure 1C:
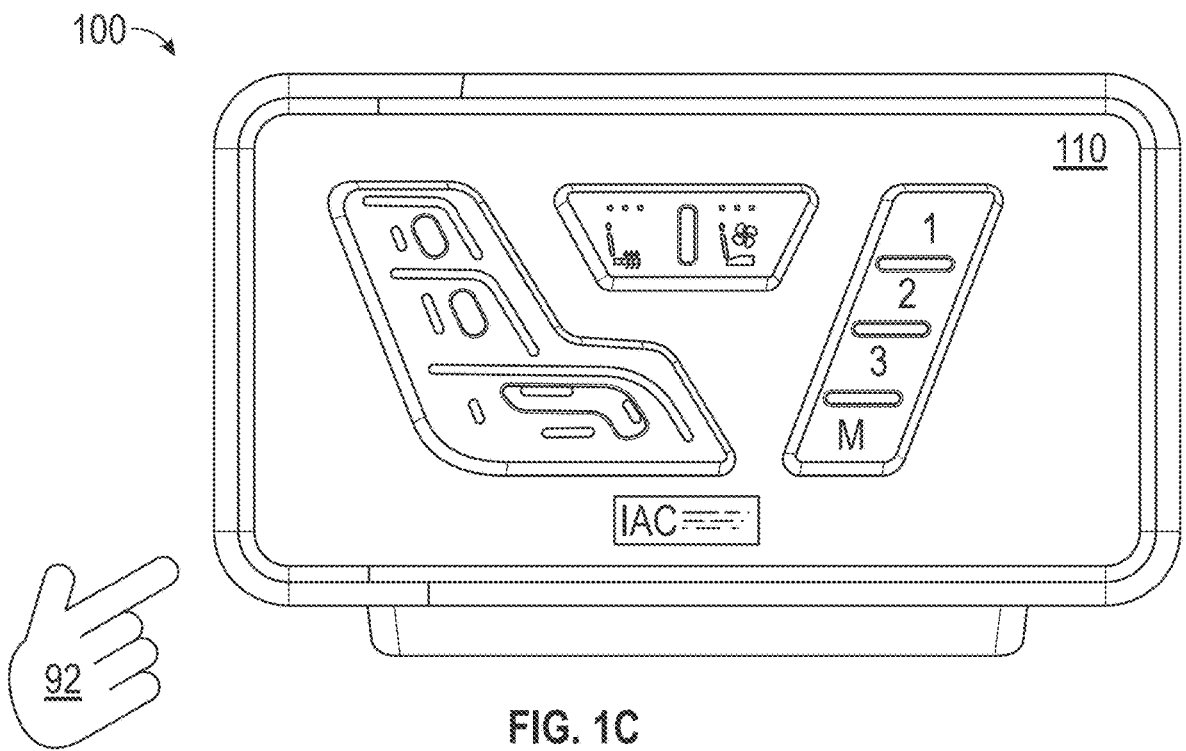
Figure 1D:
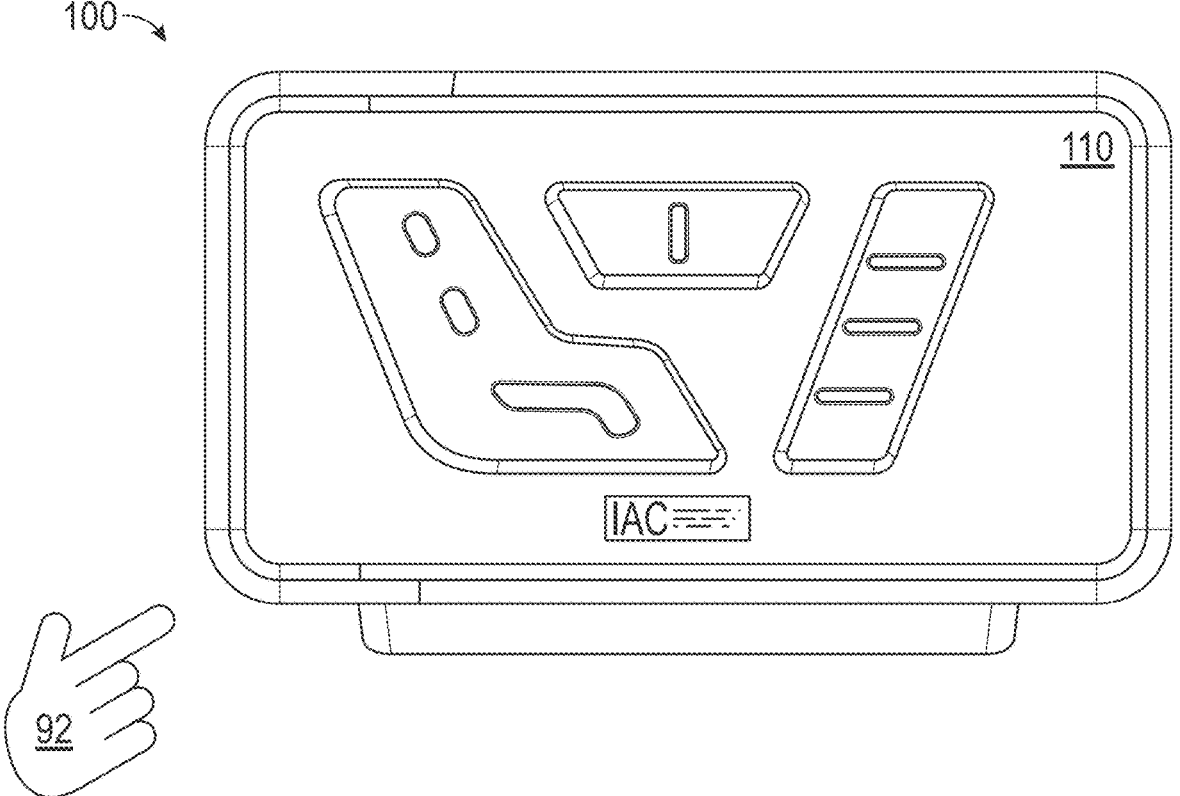
Figure 1E:
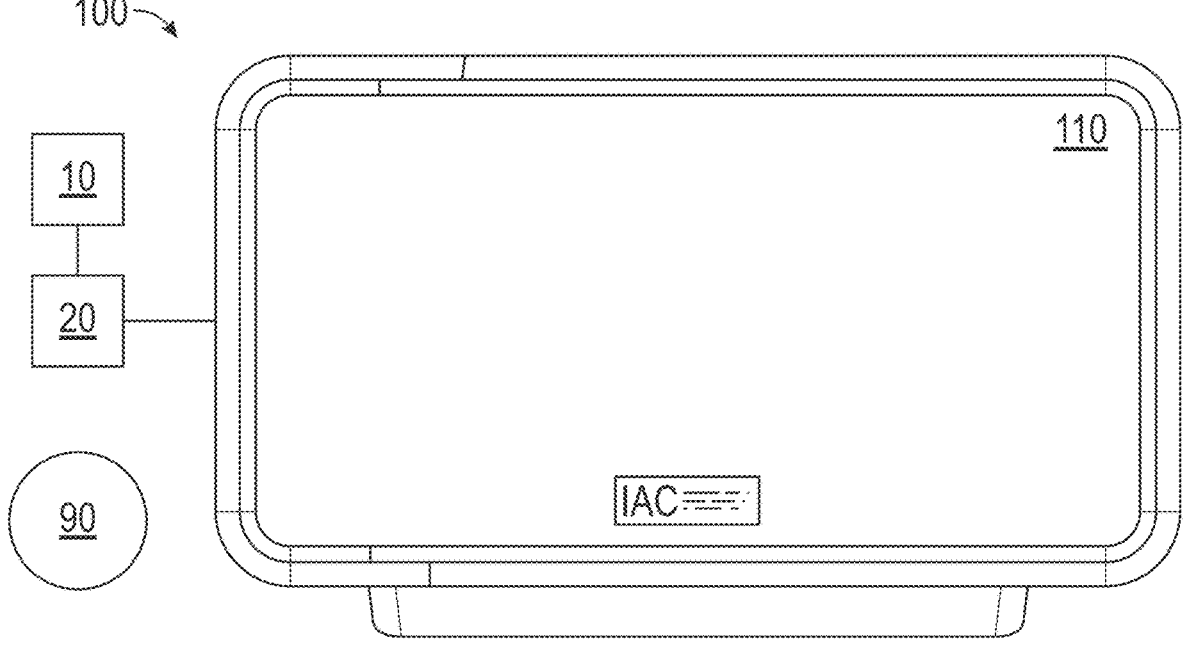
Figure 2A:
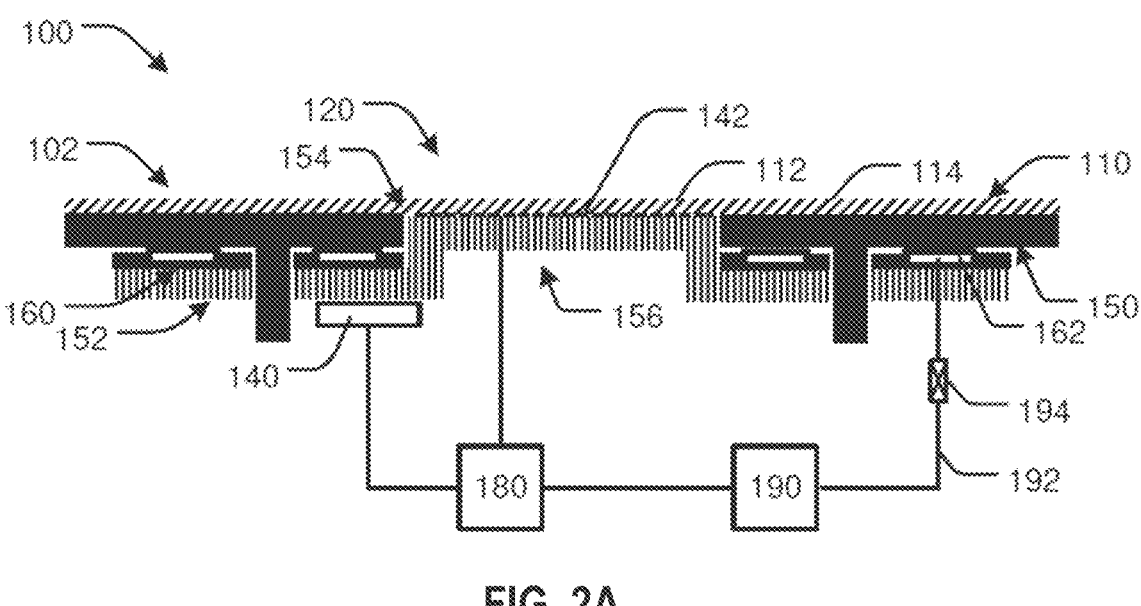
Figure 2B:
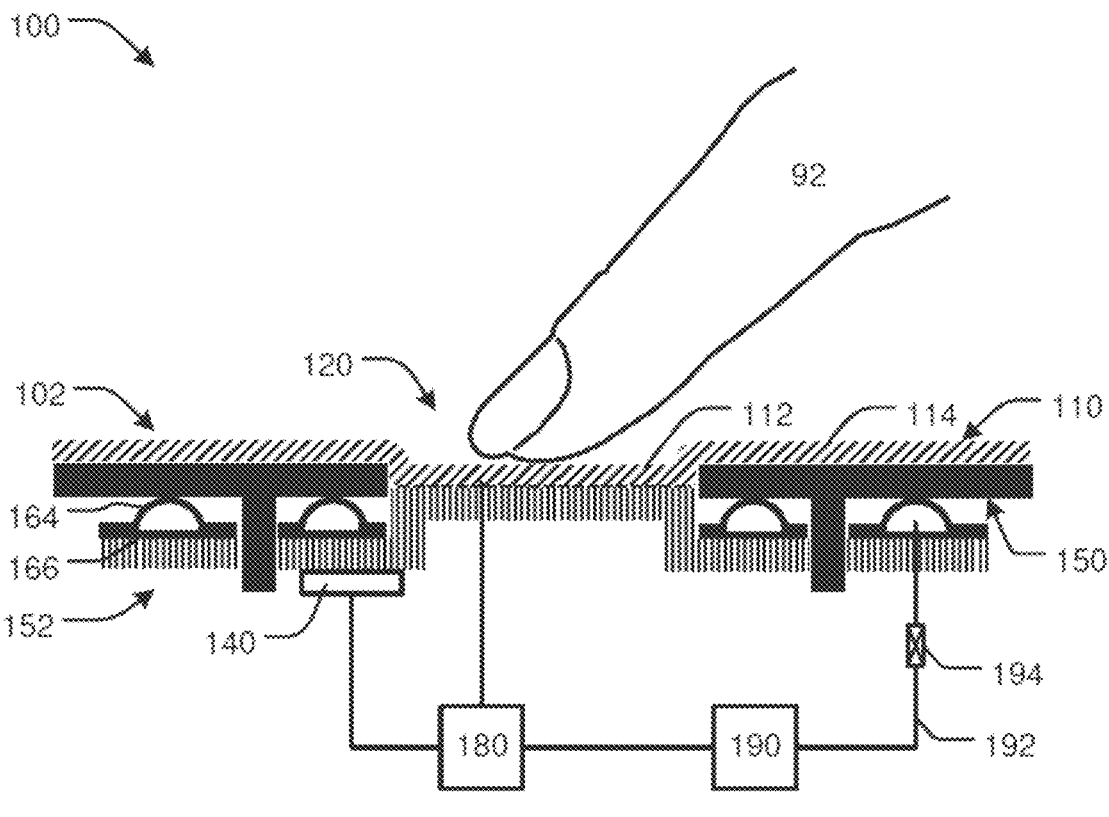
Figure 2C:
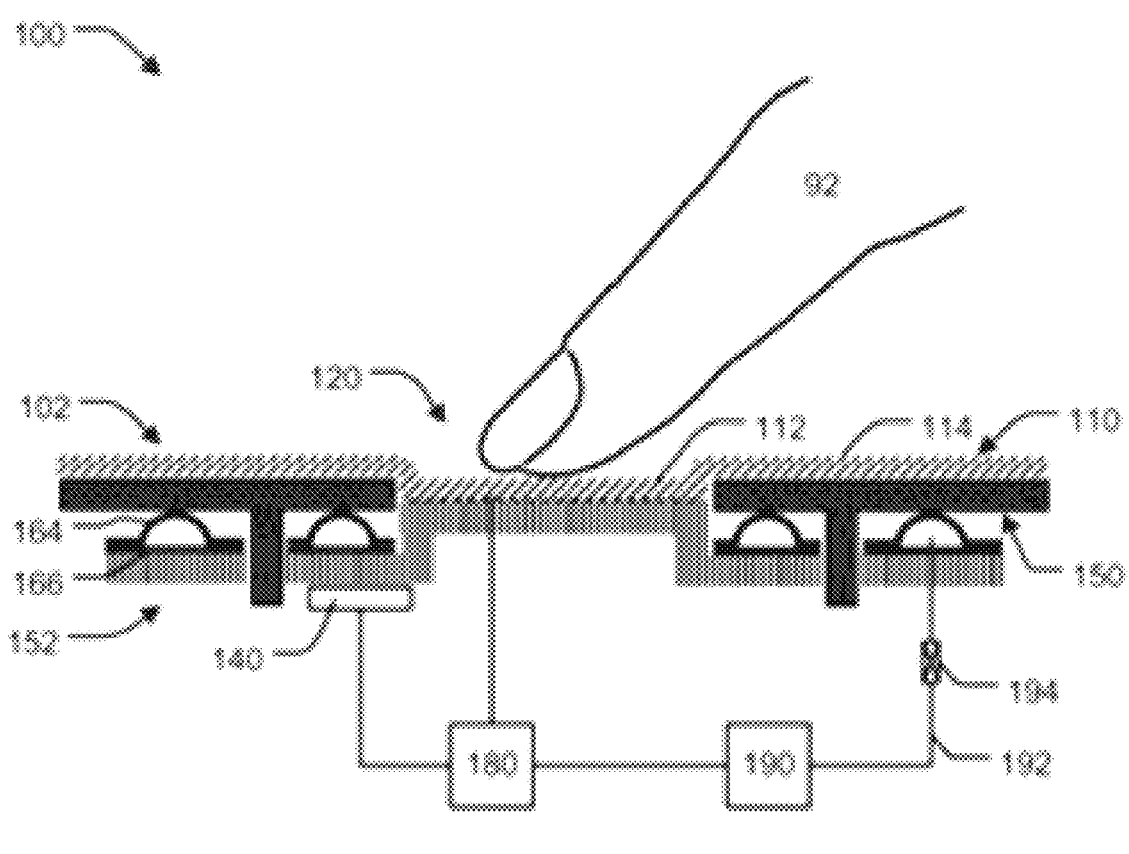
Figure 2D:
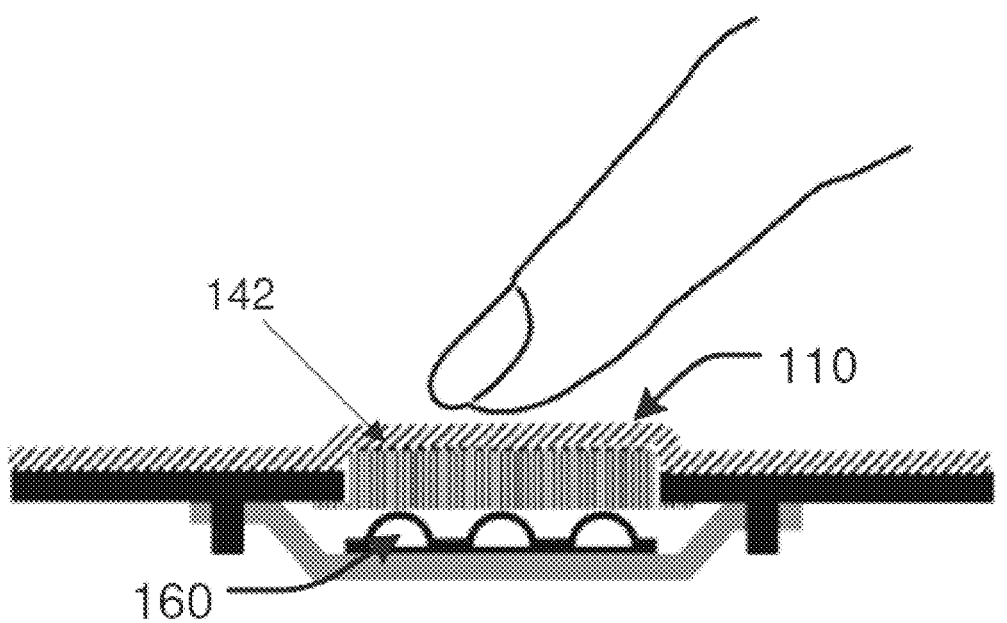

FIG. 1C is a front plan view of an article according to the present disclosure with a (hybrid) shape/contour of the outer surface revealing the location of controller(s) for operation of the motor vehicle, such that the location of the controller(s) is/are revealed/exposed or otherwise backlit and visible tacitly and visually to the occupant of the vehicle, and the controller(s) are further lighted with backlighting to further assist in revealing their location, for driver distraction free operation;

FIG. 1D is front plan view of an article according to the present disclosure with a (hybrid) shape/contour of the outer surface revealing the location of controller(s) for driver distraction-free operation of the motor vehicle as in FIG. 1B after the backlighting is eliminated;

FIG. 1E is front plan view of an article according to the present disclosure with a (hybrid or hydraulic textile) shape/contour of the outer surface concealing the location of controller(s) for operation of the motor vehicle as in FIG. 1A after returning to an initial state;

FIG. 2A is a cross-sectional view of an article according to the present disclosure with a shape/contour of the outer surface concealing the location of controller(s) for operation of the motor vehicle, such that the location of the controller(s) is/are concealed/hidden or otherwise invisible to an occupant of the vehicle;

FIG. 2B is a cross-sectional view of an article according to the present disclosure (as the occupant hand approaches and is detected by the proximity sensor—wake-up) with a shape/contour of the outer surface revealing the location of controller(s) for operation of the motor vehicle, such that the location of the controller(s) is/are revealed/exposed or otherwise visible to the occupant of the vehicle;

FIG. 2C is a cross-sectional view of an article according to the present disclosure (as the occupant touches the surface and the sensor activates the control function) with a shape/contour of the outer surface revealing the location of controller(s) for operation of the motor vehicle, such that the location of the controller(s) is/are revealed/exposed or otherwise visible to the occupant of the vehicle;

FIG. 2D is a cross-section view of an article according to the present disclosure illustrating the reveal of positive morphing.

Figure 3A:
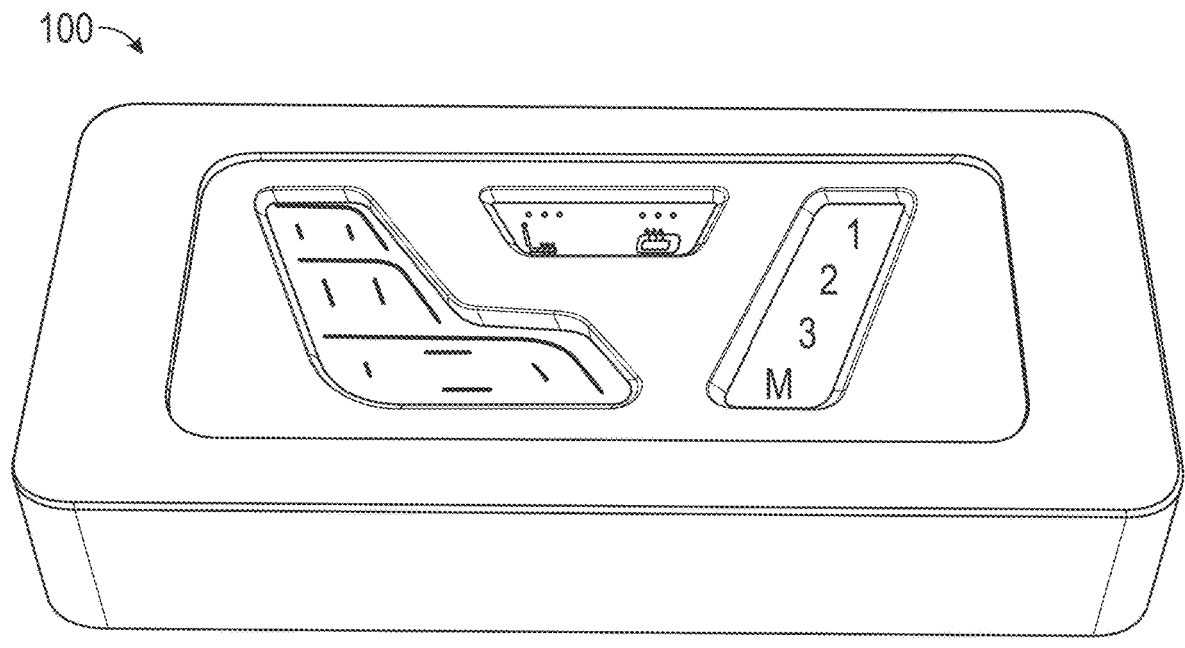
Figure 3B:
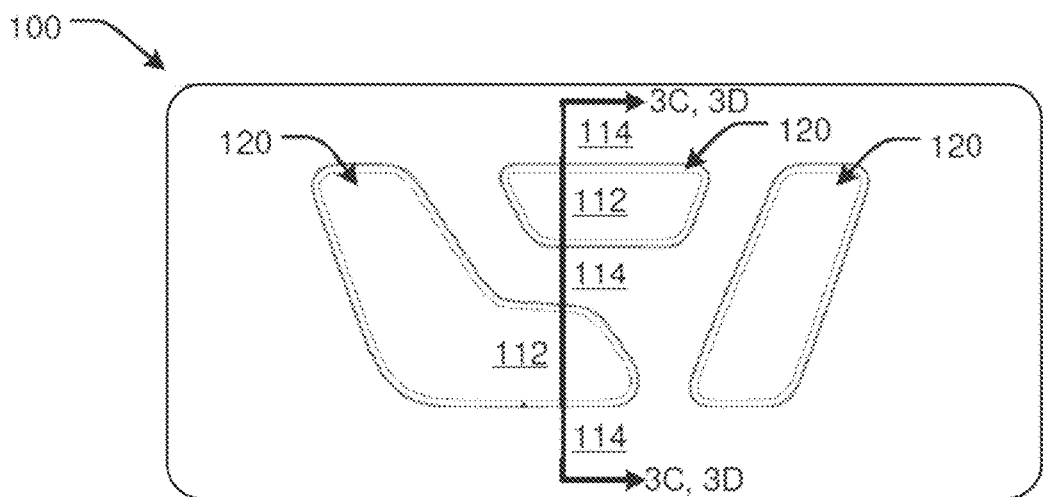
Figure 3C:
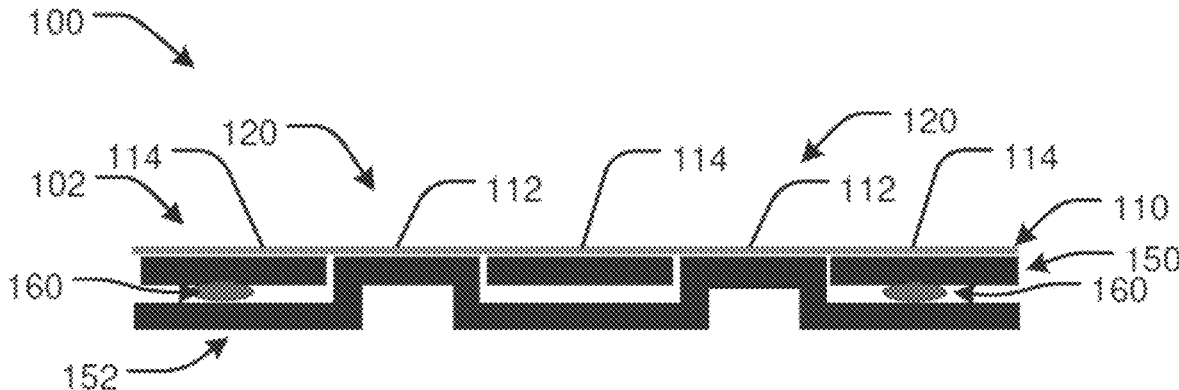
Figure 3D:
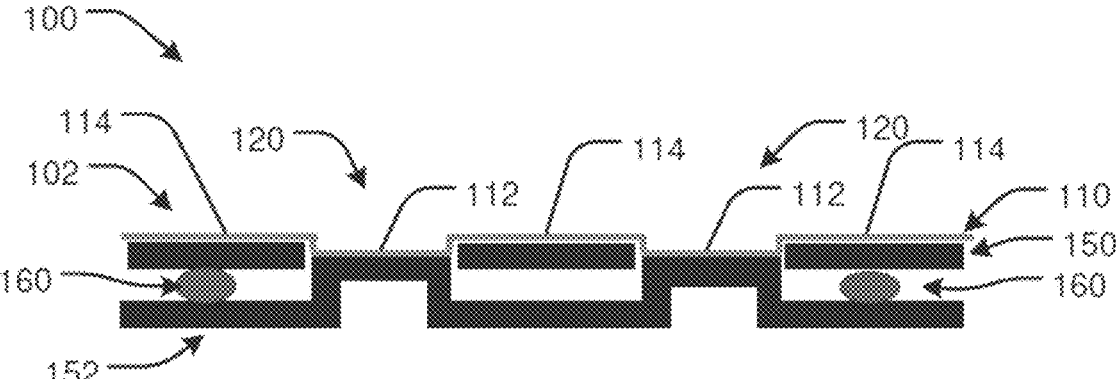
Figure 4A:
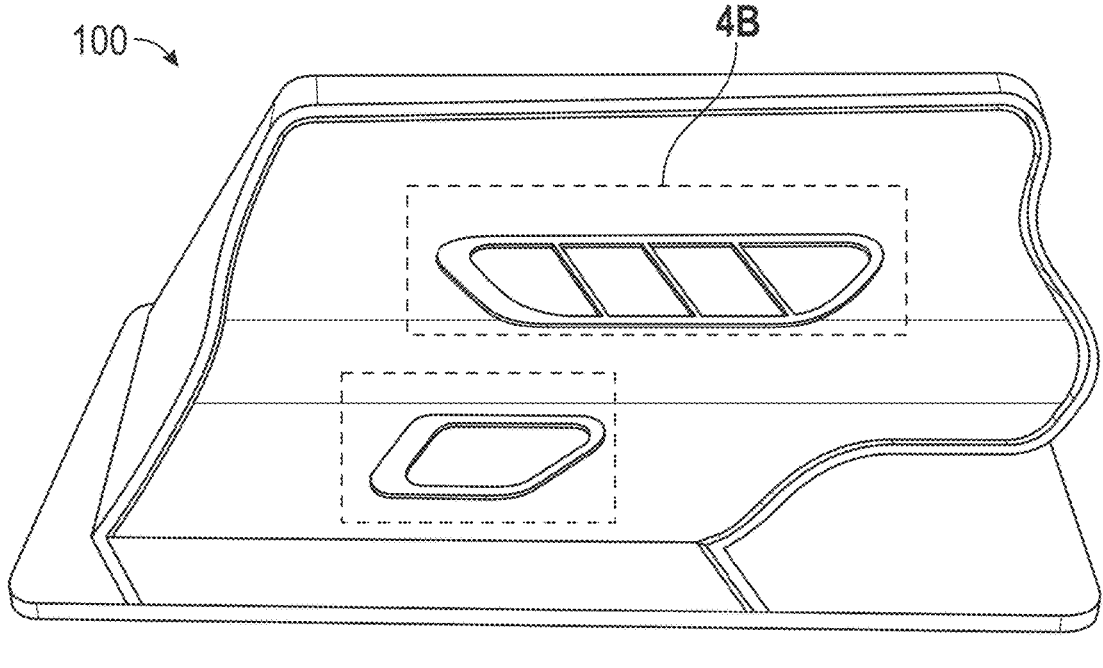
Figure 4B:
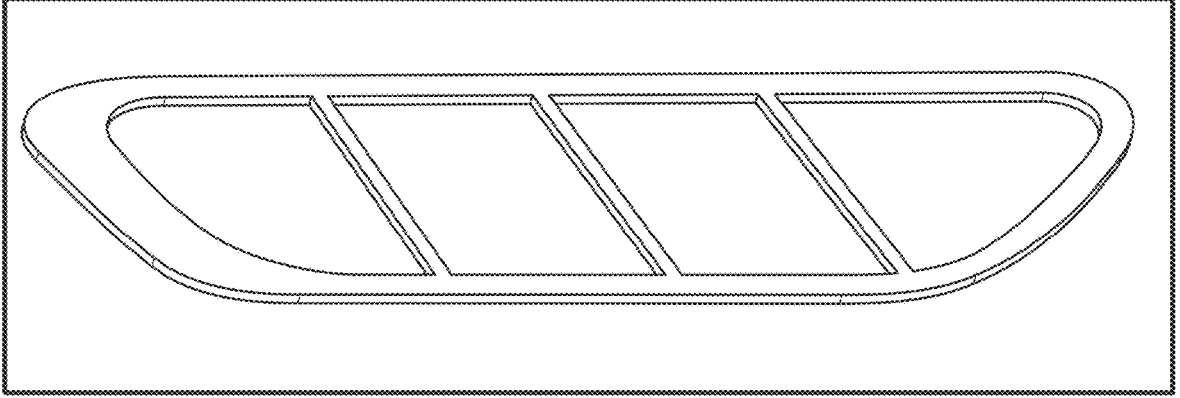
Figure 5:
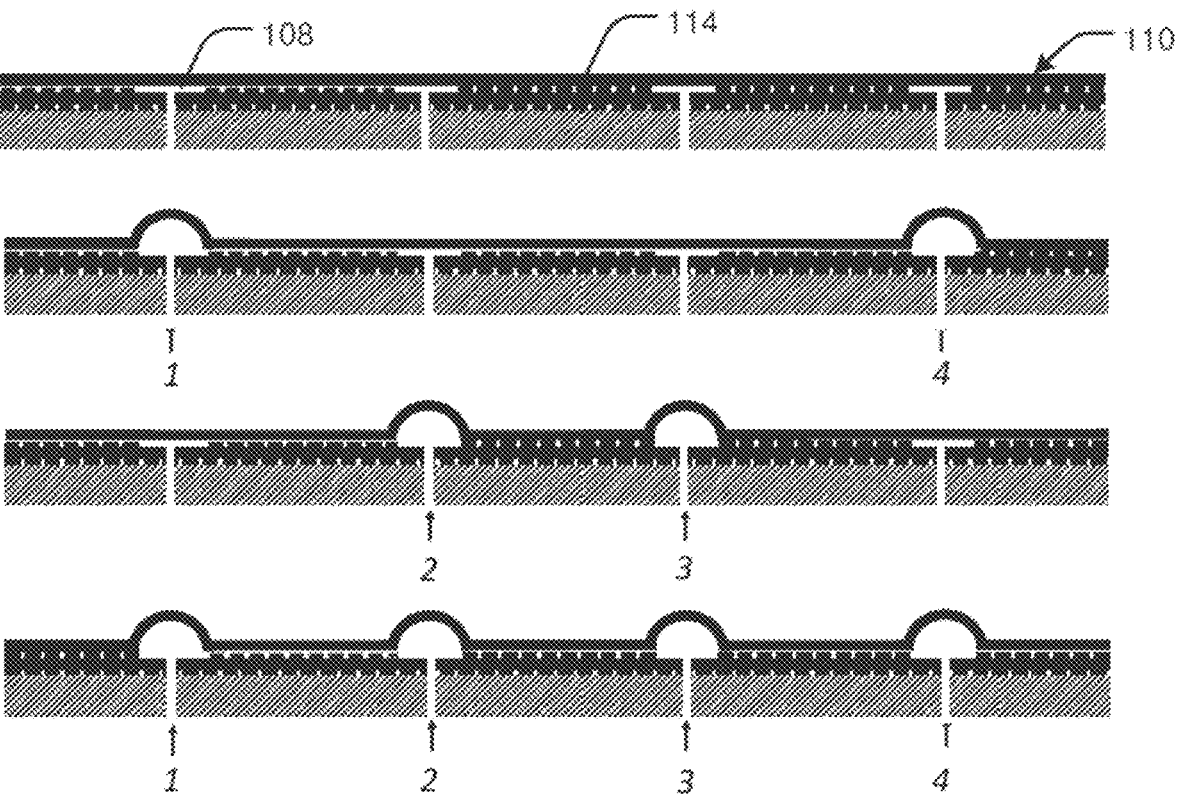
Figure 6:
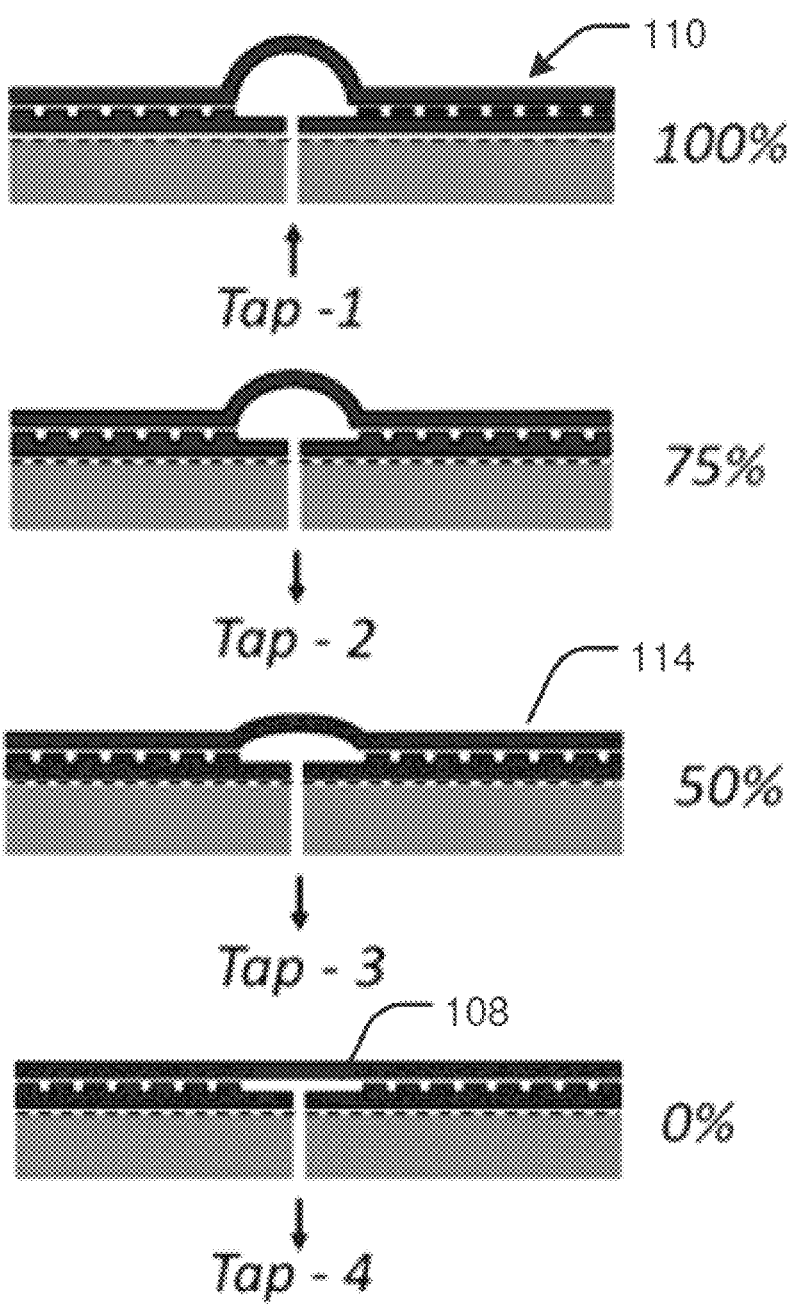
Figure 7:
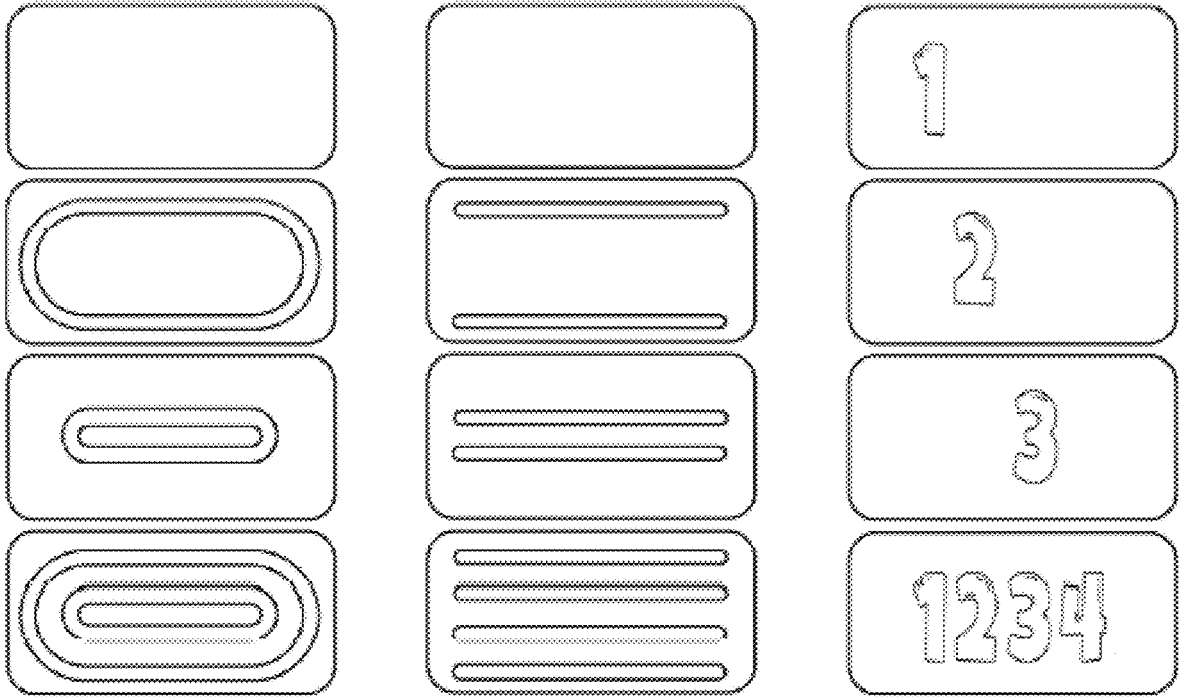

FIG. 3A is a perspective view of the article representative of an interior trim article with a seat controller, particularly a seat switch arrangement to operate functions of a seat;

FIG. 3B is a plan view of the article of FIG. 3A identifying a section cut-through;

FIG. 3C is a cross-sectional view of the article of FIGS. 3A and 3B taken along cross-section line 3C-3C of FIG. 3B with a shape/contour of the outer surface concealing the location of controller(s) for operation of the motor vehicle, such that the location of the controller(s) is/are concealed/hidden or otherwise invisible to an occupant of the vehicle;

FIG. 3D is a cross-sectional view of the article of FIGS. 3A and 3B taken along cross-section line 3D-3D of FIG. 3B with a shape/contour of the outer surface revealing the location of controller(s) for operation of the motor vehicle, such that the location of the controller(s) is/are revealed/exposed or otherwise visible to the occupant of the vehicle;

FIG. 4A is a perspective view of the article as an interior trim article with a door panel controller, particularly a door panel switch arrangement to operate functions of windows and/or door locks that is also possible with backlighting;

FIG. 4B is a close-up view of the area of FIG. 4A bounded by dashed rectangle 4B;

FIG. 4C is a plan view of FIG. 4B;

FIG. 4D is a cross-sectional view of the article of FIGS. 4B and 4C taken along cross-section line 4D-4D of FIG. 4C with a shape/contour of the outer surface concealing the location of controller(s) for operation of the motor vehicle, such that the location of the controller(s) is/are concealed/hidden or otherwise invisible to an occupant of the vehicle;

FIG. 4E is a cross-sectional view of the article of FIGS. 4B and 4C taken along cross-section line 4E-4E of FIG. 4C with a shape/contour of the outer surface revealing the location of controller(s) for operation of the motor vehicle, such that the location of the controller(s) is/are revealed/exposed or otherwise visible to the occupant of the vehicle;

FIG. 5 is a cross-sectional view showing that the morphed surfaces herein may locally change shape and their associated relative hardness/softness in varying degrees and sequence;

FIG. 6 is another cross-sectional view showing the morphed surfaces that alter shape in a sequence of steps depending upon taps (physical touching) by the user;

FIG. 7 show the types of sequencing patterns that may be achieved via the morphed surfaces herein; and The drawings included herewith are for illustrating various examples of articles, methods, and apparatuses of the teaching of the present specification and are not intended to limit the scope of what is taught in any way.

DETAILED DESCRIPTION

While the principles of the disclosure have been described herein, it is to be understood by those skilled in the art that this description is made only by way of example and not as a limitation as to the scope of the disclosure. Other embodiments are contemplated within the scope of the present disclosure in addition to the exemplary embodiments shown and described herein. It will be appreciated by a person skilled in the art that an apparatus may embody any one or more of the features contained herein and that the features may be used in any particular combination or sub-combination. Modifications and substitutions by one of ordinary skill in the art are considered to be within the scope of the present disclosure, which is not to be limited except by the claims.

Referring now to FIGS. 1A-1E, there is shown an article 100 of a motor vehicle 10 according to the present disclosure. The article 100 may be disposed within an interior 20 of the motor vehicle 10, and thus may be referred to as an interior article, component or more particularly be an interior trim article. As shown in FIG. 1, the outer surface 110 may initially present itself as a relatively flat two-dimensional (2D) surface.

Briefly referring to FIG. 1B, the article 100 includes a shape-shiftable (morphable) outer surface 110, which includes one or more shifting surface regions 112 adjacent, and more particularly (at least partially or completely) surrounded by, one or more non-shifting surface regions 114. The shifting surface region(s) 112 may shift (e.g. move relative to the non-shifting surface region(s) 114) between a plurality of different positions, in response to an object 92 entering a predetermined proximity/distance of the outer surface 110 without physically contacting either the shifting surface region(s) 112 and/or non-shifting surface region(s) 114), while the non-shifting regions(s) remain in a fixed (static) position at all times. Such position shifting of the shifting surface region(s) 112 relative to the non-shifting surface region(s) 114 results in the outer surface 110 exhibiting a plurality of different shapes/contours depending on the position of the shifting surface region(s) 112 relative to the non-shifting surface region(s) 114. This may therefore be considered as providing both a 2D and relatively flat surface in combination with a 3D contour. As shown, the shifting surface region(s) 112 may include one or more controllers 120 (e.g. vehicle operation switches) which control operational functions of the motor vehicle 10. This then is contemplated to provide relatively driver distraction free operation of the motor vehicle 10. In certain embodiments, the controllers 120 may be electrical, mechanical, mechatronic or electromechanical.

In at least one of the shapes/contours of the outer surface 110, the shape/contour of the outer surface 110 may conceal a location of vehicle operation controller(s) 120, particularly for occupant operation of the motor vehicle 10, such that the location of the controller(s) 120 is/are concealed/hidden or otherwise invisible to an occupant 90 of the vehicle 10.

In another one of the shapes/contours of the outer surface 110, the shape/contour of the outer surface 110 may reveal the location of the vehicle operation controller(s) 120 for operation of the motor vehicle 10, such that the location controller(s) 120 is/are revealed/exposed or otherwise visible to the occupant 90 of the vehicle 10.

As shown in FIG. 1A, the shifting surface region(s) 112 is/are initially in a first outer position such that the shifting surface region(s) 112 and the non-shifting surface region(s) 114 are planar relative to one another. As shown, such conceals the location of the controller(s) 120 for operation of the motor vehicle 10, such that the location of the controller(s) 120 is/are concealed/hidden or otherwise invisible to the occupant 90 of the vehicle 10.

The shifting surface region(s) 110 may be in the position shown in FIG. 1A, when no object 92 within the vehicle interior 20 is within a predetermined distance of the outer surface 110 (either the shape shifting surface region(s) 112 and/or non-shifting surface region(s) 114), as determined by one or more proximity sensors 140, such as capacitive proximity sensors, of the article 100. For example, when no object 92 is at a distance of within 15 cm of the outer surface 110, and more particularly within 10 cm of the outer surface 110 and even more particularly within 5 cm of the outer surface 110, the shifting surface region(s) 110 may be in the position shown in FIG. 1A, which conceals the location of the controller(s) 120 for operation of the motor vehicle 10.

When an object 92 within the vehicle interior 20, e.g. such as a hand, and more particularly a finger/digit of the vehicle occupant 90 in FIG. 1B, is at a distance of within 15 cm of the outer surface 110, and more particularly within 10 cm of the outer surface 110 and even more particularly within 5 cm of the outer surface 110, in each situation without physical contact, the shifting surface regions(s) 112 is/are in a second recessed position such that the shifting surface region(s) 112 are recessed relative to the non-shifting surface region(s) 114. As shown, such reveals the location of the controller(s) 120 for operation of the motor vehicle 10, such that the location of the controller(s) 120 is/are revealed/exposed or otherwise visible to the occupant 90 of the vehicle 10.

As set forth above, one or proximity sensors 140 may be used for determination of when an object 92 within the vehicle interior 20, e.g. such as a hand of the vehicle occupant 90 in FIG. 1B is at a distance of within 15 cm of the outer surface 110, and more particularly within 10 cm of the outer surface 110 and even more particularly within 5 cm of the outer surface 110. More particularly, the proximity sensor 140 may be a capacitive proximity sensor. The proximity sensors 140 may have a sensing range/distance from 0.1 cm to 15 cm from the outer surface 110, including all individual values and increments therein (e.g. 0.1 cm to 10 cm, 0.1 cm to 5 cm). The proximity sensors are contemplated to include camera based sensors, eye-tracking sensors, electromagnetic field sensors, ultrasonic sensors, radar sensors as well as wireless/contactless sensors.

Starting from FIG. 1A, no object is within the sensing range/distance of the proximity sensors 140, e.g. not within 15 cm or more particularly 10 cm or even more particularly 5 cm, of outer surface 110. Referring to FIG. 1B, when the proximity sensors 140 detect the presence of object/hand within the sending range/distance, the shifting surface regions(s) 112 move to the recessed position such that the shifting surface region(s) 112 are recessed relative to the non-shifting surface region(s) 114 to reveal the of location controller(s) 120 for operation of the motor vehicle 10.

In FIG. 1C, upon reaching the recessed position, the controller(s) 120 of the are further preferably lighted with backlighting to further assist in revealing their location. In FIGS. 1D and 1E, when the object is no longer in the sensing range/distance of the proximity sensors 140, the backlighting may be first eliminated/turned-off (FIG. 1D), and then the shifting surface regions(s) 112 moved from the recessed (inner) position to the outer position such that the shifting surface region(s) 112 and the non-shifting surface region(s) 114 are planar relative to one another (FIG. 1E).

Referring now to FIG. 2A, there is shown a cross-sectional view of an article 100 with a shape/contour of the outer surface 110 concealing the location of controller(s) 120 for operation of the motor vehicle 10, such that the location of the controller(s) 120 is/are concealed/hidden or otherwise invisible to an occupant 90 of the vehicle 10, consistent with FIGS. 1A and 1E. Referring to FIG. 2B, there is shown the cross-sectional view of the article 100 with a shape/contour of the outer surface 110 revealing the location of controller(s) 120 for operation of the motor vehicle 10, such that the location of the controller(s) 120 is/are revealed/exposed or otherwise visible to the occupant 90 of the vehicle 10, consistent with FIGS. 1B-1D.

As shown in FIGS. 2A-2B, outer surface 110 is provided by a top surface of a cover 102, which is supported by a first (outer) substrate 150 and a second (inner) substrate 152. When referred to as outer substrate 150 and inner substrate 152, it should be understood that where the outer substrate 150 and inner substrate 152 overlap, the outer substrate 150 overlies the inner substrate 152 with the outer substrate 150 being closer to the outer surface 110 of the article 100 than the inner substrate 152. As may be further understood herein, the first substrate 150 may also referred to as a stationary or fixed substrate, while the second substrate 152 may be referred to as a moving, movable or controller substrate.

As shown, cover 102 is bonded (e.g. adhesively) to the top of the first substrate 150 in the non-shifting surface region(s) 114 of the outer surface 110, and bonded (e.g. with adhesive or welded via dielectric or sonic techniques) to the second substrate 152 in the shifting surface region(s) 112 of the outer surface 110, with a thin (e.g. 0.1 mm to 1 mm) touch sensor/contact switch 142 located there between. Alternatively, the touch sensor/contact switch 142, including the circuit, may be printed (e.g. screen print or digital ink-jet) directly on the B-side (back side/lower side) of the cover 102 or the A-side (top side/upper side) of the substrate 152. Also alternatively, the touch sensor/contact switch 142 may be assembled/attached (separate) or printed to/on the B-side of the substrate 152. As shown, the cover 102 extends across the first substrate 150 and the second substrate 152 with the outer surface 110 being continuous (i.e. no discontinuity of the cover 102 as it extends across the interface of the first substrate 150 and the second substrate 152).

Cover 102, including outer surface 110 may be in a form of a polymer foil/film (e.g. roll-stock/sheet-stock) and/or a textile/fabric (e.g. roll-stock/sheet-stock). The cover 102 may be formed of a natural or synthetic polymer composition, or of natural leather. Substrates 150, 152 may similarly be formed of a polymer composition, such as a thermoplastic polymer composition, which may comprise polypropylene or ABS, or other polymer material formed via injection molding.

As shown first substrate 150 includes a through-hole opening (window aperture) 154 which is occupied by a protrusion 156 of second substrate 152 when the shifting surface region(s) 112 and the non-shifting surface region(s) 114 are planar relative to one another.

As shown, a flexible deformable bladder 160 is disposed between the first substrate 150 and the second substrate 152. As shown in FIG. 2A, the bladder 160 is in a compressed/deflated state, while in FIG. 2B, the bladder 160 is in an expanded/inflated state. Bladder 160 has a cavity/channel/canal 162 for fluid, which may be disposed between opposing walls 164, 166. The bladder 160 may be formed of an elastomer, such as a thermoplastic elastomer. It should be understood that in the context of the present disclosure, air is considered a fluid.

Controller 120 may comprise a backlit touch sensor/contact switch/control 142, which is shown preferably located between the cover 102 and the second substrate 152, within the confines of through-hole opening 154 of the first substrate 150.

With regards to operation, when the proximity sensors 140 detect the presence of object 92 within the sending range/distance, e.g. such as a hand of the vehicle occupant 90 in FIG. 1B within 10 cm of the outer surface 110, and more particularly within 10 cm of the outer surface 110 and even more particularly within 5 cm of the outer surface 110, the proximity sensor 140 sends a signal (e.g. voltage signal) to control unit 180. Control unit 180 then sends a signal (e.g. voltage signal) to a fluid source 190 to provide fluid to the cavity 162 of bladder 160 via fluid line 192. Fluid source 190 may be a gas (air pneumatic) or a liquid (hydraulic) fluid source, and may include a positive pressure pump to provide the fluid to the bladder 160.

As the bladder 160 expands/inflates, as shown in FIG. 2B, such forces/pushes the second substrate 152 to move away from (inwards/downwards relative to) the first substrate 150, which remains in a fixed (static) position at all times. As a result, the shifting surface regions(s) 112 of the outer surface 110 is/are in a second recessed position such that the shifting surface region(s) 112 are recessed relative to the non-shifting surface region(s) 114. As shown, such reveals the location of the controller(s) 120 for operation of the motor vehicle 10, such that the location of the controller(s) 120 is/are revealed/exposed or otherwise visible to the occupant 90 of the vehicle 10.

During or after the expansion/inflation of bladder 160, controller 180 may send a signal to touch sensor/contact switch 142 to turn-on backlighting.

Thereafter, upon touch contact of the outer surface 110 of cover 110 by object 92 of occupant 90 of the vehicle 10, the controller 120, via touch sensor/contact switch 142 and/or the control unit 180 sends a signal to the operational function of the motor vehicle 10 actuated thereby.

Conversely, when no object is within the sensing range/distance of the proximity sensors 140, such is detected by control unit 180 which may send a signal to turn off the backlighting. At the same time or immediately thereafter (e.g. within 2 seconds), the control unit 180 may send another signal to fluid/pneumatic source 190 to remove the fluid/air from the cavity/channel 162 of bladder 160 via fluid/air line 192. Fluid source 190 may include a negative pressure (vacuum) pump to remove the fluid/air from bladder 160 via fluid/air line 192 and return it to the fluid/pneumatic source 190.

Vacuum within the bladder 160 created while extracting the fluid may operate to compress/deflate the bladder 160 to force/pull the second substrate 152 to move closer to (outwards/upwards relative to) the first substrate 150 which, again, remains in a fixed (static) position at all times. As a result, the shifting surface region(s) 112 is/are returned to the first outer position such that the shifting surface region(s) 112 and the non-shifting surface region(s) 114 are planar relative to one another, which conceals the location of the controller(s) 120 for operation of the motor vehicle 10, such that the location of the controller(s) 120 is/are concealed/hidden or otherwise invisible to the occupant 90 of the vehicle 10.

Alternatively, when fluid is removed from bladder 160 and such is compressed air, such may be expelled to atmosphere the by opening of a valve 194 in the fluid/air line 192. In such instance, the bladder 160 may have sufficient elastic memory to return to the position shown in FIG. 2A without the assistance of negative (vacuum) pressure, as the air pressure dissipates. The air-inlet valve 194 may be located and assembled on the substrate with a connection to the electronics and pump. The air inlet valve may also be pre-assembled to the back material.

FIG. 2C is a cross-sectional view now showing touching of the occupant to activate the sensor (142 shown in FIG. 2A) to control a given operational function of the vehicle. Upon touching the surface 110, haptic feedback signals may be provided that confirms to the occupant that the sensor has been activated and the desired operation function in the vehicle has been initiated.

FIG. 2D illustrates what is termed herein as positive morphing. As can be seen, in this embodiment, the bladder 160 is positioned such that in an expanded state, the surface 110 is raised to reveal the location of the sensor 142.

In another embodiment of the article 100 according to the present disclosure as shown in FIGS. 3A-3D, similar to the prior embodiment, the article 100 has an outer substrate 150 and an inner substrate 152.

As shown in FIG. 3C, the bladder 160 is disposed between the first substrate 150 and the second substrate 152, and is compressed/deflated. As also shown in FIG. 3C, the shifting surface region(s) 112 is/are in a first outer position such that the shifting surface region(s) 112 and the non-shifting surface region(s) 114 are planar relative to one another. As shown, such conceals the location of the controller(s) 120 for operation of the motor vehicle 10, such that the location of the controller(s) 120 is/are concealed/hidden or otherwise invisible to the occupant 90 of the vehicle 10.

As shown in FIG. 3D, the bladder 160 is now expanded/inflated when an object 92 within the vehicle interior 20, e.g. such as a hand of the vehicle occupant 90 in FIG. 1A is within 15 cm of the outer surface 110, and more particularly within 10 cm of the outer surface 110 and even more particularly within 5 cm of the outer surface 110, the shifting surface regions(s) 112 is/are in a second recessed position such that the shifting surface region(s) 112 of the outer surface 110 are recessed relative to the non-shifting surface region(s) 114. As shown, such reveals the location of the controller(s) 120 for operation of the motor vehicle 10, such that the location of the controller(s) 120 is/are revealed/exposed or otherwise visible to the occupant 90 of the vehicle 10. As shown, upon expansion of the bladder 160, the inner substrate 152 moves relative to the outer substrate 150, which remains in a fixed (static) position at all times.

As described above, it should be understood that the bladder 160 may particularly be a gas (air/pneumatic) bladder. However, in other embodiments the evaluated fluid may be a liquid, in which case the bladder 160 may be understood as a liquid (hydraulic) bladder. In still other embodiments, movement of the shifting surface regions 112 may be accomplished mechanically by a linear actuator, and more particularly by an electromagnetic/solenoid actuator.

In another embodiment of the article 100 according to the present disclosure as shown in FIGS. 4A-4E, the shifting of the outer surface 110 is performed only by the cover 102. Also, the controller(s) 120 are disposed in the non-shifting surface regions 114 rather than the shifting surface regions 112 of the prior embodiments.

As shown by FIG. 4D, the cover 102 preferably comprises an outer layer 104 and an inner layer 106. As shown the outer layer 104 and the inner layer 106 are bonded to one another in the non-shifting surface regions 114. As also shown, the outer layer 104 and the inner layer 106 are not bonded to one another in the shifting surface regions 112. As such, a gap is disposed between the outer layer 104 and the inner layer 106 which provides a channel 108 which expands/inflates when a fluid (e.g. air) is introduced from fluid source 190 to form the shifting surface regions 112.

Additionally, assuming the substrate and/or cover material(s) are translucent or transparent preferably allowing for selective backlighting, graphics/ISO icons/symbols/decorative graphics & light masking may be screen or digitally printed on the B-side of cover 102/outer layer 104 or first substrate 150 or second substrate 152. Furthermore it is possible to also screen print or digitally print a conductive circuit & sensor with integrated flexible electrical connections (wire harness) on the substrates and cover materials.

Expanding on the above, the present disclosure may rely upon capacitive sensor for detection of an occupant's hand which can be integrated herein in a number of preferred procedures. For example, the capacitive sensor may be assembly on the backside of the substrate, either the first substrate 150 or second substrate 152. It may also be digitally ink-jet printed or screen printed on the A-surface or B-side of the substrate 150/152 or B-side of the cover material 104/106. One may also heat transfer a relatively flexible layer to the back side of the cover material. It may also be optically clear laminated on the A-side or B-side of the substrate 150/152. It may also be in the form of a separate printed circuit board that includes a capacitive sensor assembled on the B-side of the substrate. This may include a MEMs force sensor or conductive material, e.g., spring, metal or sheet.

Preferably, upon the approach of an occupant's hand, the wake-up of the shape-shifting device herein occur 10 cm to 15 cm from the surface. The wake-up action may then include the A-surface morphing into the desired control shape and the backlighting becoming visible for orientation and feedback The wake-up distance may also be altered by reprogramming.

The micropump contemplated for use herein as the fluid/source pump 190 is relatively silent and preferably emits a sound of less than or equal to 10 db. The micropump is preferably assembled on the B-side of the substrate, or within a separate sealed housing that assembles to the B-side of the substrate. The preferred dimensions of the micropump are 29 mm×11 mm or smaller, and a weight of 5.0 grams or less.

The cover materials suitable for use herein that are subject to shape-shifting are preferably selected from poly(vinyl chloride), polyurethane, thermoplastic olefins, thermoplastic polyurethanes, polyesters (e.g. PET), or polysiloxane polymers as rolled film/foil coverstock. The cover material may also be fabric/textile/non-woven based. The cover materials are also preferably selected so that they have the requisite elongation and memory mechanical properties to undergo repeated shape-shifting. Namely they have the requisite elastic recovery properties to continuously present a flush surface when laying relatively flat in a 2D configuration. Such cover materials are therefore preferably selected with attention to their elastic properties and with respect to their creep resistance characteristics (strain versus time under a constant stress). Accordingly, for a given level of deformation that occurs during shape-shifting herein, it is preferred that the selected materials maintain their elastic recovery properties to as noted, provide a relatively flat-surface when in a non shape-shifted configuration.

The shape-shifting assembly herein is contemplated to have a number of advantages due to use of a hydraulic-pneumatic system. These include, but are not limited to reduced complexity in the sense of relatively fewer parts, ease of assembly, lower mass and relatively lower cost.

FIGS. 5 and 6 show another embodiment of the present disclosure that shows sequencing. That is, selected surfaces that are made to undergo selective upper bladder expansion. As shown in FIG. 5, the system may be configured such that it provides a visual or aesthetic function that may mimic movement of a shape or form change. In other words, selected locations may shift (locations 1 and 4) and become visible to the occupant while other selected locations remain non-visible and non-shifting. Then, locations 2 and 3 may shift while locations 1 and 4 are non-shifting. Or, locations 1, 2, 3 and 4 may all be configured to shift at the same time. As next shown in FIG. 6, the shifting may be such that upon initial touch by a user (tap 1) there is a full range (100%) shift in the surface. Upon tap 2, the shift may be reduced to 75%, upon tap 3 by the user, the shift may be reduced to 50%, and upon tap 4, the shift is removed. As may be appreciated, this may work in opposite manner, meaning upon tap 1, the shift is 50%, upon tap 2 the shift is 75%, and upon tap 3, the shift is 100%. In this manner, a user may select/regulate the amount/level of inflation and expansion of channel 108, and/or the amount/level of deflation, between a plurality of selected amounts/levels. FIG. 7 provides an example of some sequencing and aesthetic patterns that are contemplated for the morphed surfaces disclosed herein.

While various embodiments of the present disclosure has been described, it should be understood that various changes, adaptations and modifications can be made therein without departing from the spirit of the invention(s) and the scope of the appended claims. The scope of the invention(s)

should, therefore, be determined not with reference to the above description, but instead should be determined with reference to the appended claims along with their full scope of equivalents. Furthermore, it should be understood that the appended claims do not necessarily comprise the broadest scope of the invention(s) which the applicant is entitled to claim, or the only manner(s) in which the invention(s) may be claimed, or that all recited features are necessary.

LISTING OF REFERENCE CHARACTERS

10 motor vehicle
20 motor vehicle interior
90 vehicle occupant
92 object/vehicle occupant
100 article
102 cover
104 cover outer layer
106 cover inner layer
108 cover channel
110 outer surface
112 shifting surface region(s)
114 non-shifting surface region(s)
120 controller(s)
140 proximity sensor(s)
142 touch sensor(s)/contact switch(s)
150 first substrate
152 second substrate
154 through-hole opening
156 protrusion
160 bladder
162 bladder cavity
164 bladder wall
166 bladder wall
180 control unit
190 fluid source/pump
192 fluid line
194 valve

What is claimed is:

1. A method of operating an interior article of a motor vehicle, comprising:

providing the article, the article having an outer surface including at least one shifting surface region and at least one non-shifting surface region adjacent the shifting surface region, the article having at least one proximity sensor configured to detect an object within a sensing distance of the outer surface, the article having at least one controller operable to operate at least one operational function of the vehicle by an occupant of the vehicle, the controller disposed beneath the outer surface and activatable by the vehicle occupant upon the vehicle occupant touching the outer surface of the article, the article arrangeable in a first positional arrangement of the shifting surface region and the non-shifting surface region relative to each other such that the outer surface of the article has a first shape concealing a location of the controller from the vehicle occupant, the article arrangeable in a second positional arrangement of the shifting surface region and the non-shifting surface region relative to each other such that the outer surface of the article has a second shape revealing the location of the controller to the vehicle occupant; and moving the shifting surface region relative to the non-shifting surface region from the first positional arrangement concealing the location of the controller from the vehicle occupant to the second positional arrangement revealing the location of the controller to the vehicle occupant, in response to the proximity sensor detecting the object within the sensing distance of the outer surface.

2. The method of claim 1 wherein the at least one proximity sensor comprises a capacitive sensor, a camera-based sensor, an eye-tracking sensor, an electromagnetic field sensor, an ultrasonic sensor, a radar sensor, or a wireless sensor.

3. The method of claim 1 wherein the at least one proximity sensor as a sensing range which detects the object when the object is at a distance of 0.1 cm to 15 cm of the outer surface of the article.

4. The method of claim 1 wherein the at least one proximity sensor is operable to detect the object being a hand or finger of the occupant of the vehicle.

5. The method of claim 1 wherein the controller further comprises backlighting; and lighting the backlighting of the contoller when the shifting surface region is in the second positional arrangement revealing the location of the controller to the vehicle occupant.

6. The method of claim 1 wherein the article further comprises a flexible deformable bladder; and moving the shifting surface region relative to the non-shifting surface region further comprises inflating and/or deflating the flexible deformable bladder to move the shifting surface region relative to the non-shifting surface region.

7. The method of claim 6 wherein the article further comprises a fluid pump to inflate and/or deflate the flexible deformable bladder; and the flexible deformable bladder is a gas bladder or a liquid bladder.

8. The method of claim 6 wherein the controller is operable to inflate or deflate the flexible deformable bladder to a plurality of selected levels of inflation and/or a plurality of selected levels of deflation.

9. The method of claim 1 wherein the outer surface comprises a cover material which is:

translucent or transparent; and/or formed of poly(vinyl chloride), polyurethane, thermoplastic olefin, polyester, or polysiloxane.

10. The method of claim 1 father comprising moving selected portions of the shifting surface region in sequence to one another from the first positional arrangement to the second positional arrangement.

11. An interior article of a motor vehicle, comprising:

an outer surface including at least one shifting surface region and at least one non-shifting surface region adjacent the shifting surface region, at least one proximity sensor configured to detect an object within a sensing distance of the outer surface, at least one controller operable to operate at least one operational function of the vehicle by an occupant of the vehicle, the controller disposed beneath the outer surface and activatable by the vehicle occupant upon the vehicle occupant touching the outer surface of the article, the article arrangeable in a first positional arrangement of the shifting surface region and the non-shifting surface region relative to each other such that the outer surface of the article has a first shape concealing a location of the controller from the vehicle occupant, the article arrangeable in a second positional arrangement of the shifting surface region and the non-shifting surface region relative to each other such that the outer surface of the article has a second shape revealing the location of the controller to the vehicle occupant; and the shifting surface region movable relative to the non-shifting surface region from the first positional arrangement concealing the location of the controller from the vehicle occupant to the second positional arrangement revealing the location of the controller to the vehicle occupant, in response to the proximity sensor detecting the object within the sensing distance of the outer surface.

12. The interior article of claim 11 wherein the at least one proximity sensor comprises a capacitive sensor, camera-based sensor, eye-tracking sensor, electromagnetic field sensor, ultrasonic sensor, radar sensor, or wireless sensor.

13. The interior article of claim 11 wherein the at least one proximity sensor as a sensing range which detects the object when the object is at a distance of 0.1 cm to 15 cm of the outer surface of the article.

14. The interior article of claim 11 wherein the at least one proximity sensor is operable to detect the object being a hand or finger of the occupant of the vehicle.

15. The interior article of claim 11 wherein the controller further comprises backlighting; and the controller is operable to light the backlighting when the shifting surface region is in the second positional arrangement revealing the location of the controller to the vehicle occupant.

16. The interior article of claim 11 wherein the article further comprises a flexible deformable bladder; and the shifting surface region is movable relative to the non-shifting surface region by inflation or deflation of the flexible deformable bladder.

17. The interior article of claim 16 wherein the article further comprises a fluid pump to inflate and/or deflate the flexible deformable bladder; and the flexible deformable bladder is a gas bladder or a liquid bladder.

18. The interior article of claim 16 wherein the controller is operable to inflate or deflate the flexible deformable bladder to a plurality of selected levels of inflation or a plurality and/or a plurality of selected levels of deflation.

19. The interior article claim 11 wherein the outer surface comprises a cover material which is:

translucent or transparent; and/or formed of poly(vinyl chloride), polyurethane, thermoplastic olefin, polyester, or polysiloxane.

20. The interior article of claim 11 further comprising the shifting surface region having selected portions being movable in sequence to one another from the first positional arrangement to the second positional arrangement.

21. A method of operating an interior article of a motor vehicle, comprising:

providing the article, the article having an outer surface including at least one shifting surface region and at least one non-shifting surface region adjacent the shifting surface region, the article having at least one proximity sensor configured to detect an object within a sensing distance of the outer surface, the article having at least one controller operable to operate at least one operational function of the vehicle by an occupant of the vehicle, the controller disposed beneath the outer surface and activatable by the vehicle occupant upon the vehicle occupant touching the outer surface of the article, the article arrangeable in a first positional arrangement of the shifting surface region and the non-shifting surface region relative to each other such that the outer surface of the article has a first shape concealing a location of the controller from the vehicle occupant, the article arrangeable in a second positional arrangement of the shifting surface region and the non-shifting surface region relative to each other such that the outer surface of the article has a second shape revealing the location of the controller to the vehicle occupant;

wherein the article further comprises a flexible deformable bladder; and moving the shifting surface region relative to the non-shifting surface region from the first positional arrangement concealing the location of the controller from the vehicle occupant to the second positional arrangement revealing the location of the controller to the vehicle occupant, in response to the proximity sensor detecting the object within the sensing distance of the outer surface; and moving the shifting surface region relative to the non-shifting surface region further comprises inflating and/or deflating the flexible deformable bladder to move the shifting surface region relative to the non-shifting surface region.

22. An interior article of a motor vehicle, comprising:

an outer surface including at least one shifting surface region and at least one non-shifting surface region adjacent the shifting surface region, at least one proximity sensor configured to detect an object within a sensing distance of the outer surface, at least one controller operable to operate at least one operational function of the vehicle by an occupant of the vehicle, the controller disposed beneath the outer surface and activatable by the vehicle occupant upon the vehicle occupant touching the outer surface of the article, the article arrangeable in a first positional arrangement of the shifting surface region and the non-shifting surface region relative to each other such that the outer surface of the article has a first shape concealing a location of the controller from the vehicle occupant, the article arrangeable in a second positional arrangement of the shifting surface region and the non-shifting surface region relative to each other such that the outer surface of the article has a second shape revealing the location of the controller to the vehicle occupant;

the shifting surface region movable relative to the non-shifting surface region from the first positional arrangement concealing the location of the controller from the vehicle occupant to the second positional arrangement revealing the location of the controller to the vehicle occupant, in response to the proximity sensor detecting the object within the sensing distance of the outer surface;

wherein the article further comprises a flexible deformable bladder; and the shifting surface region is movable relative to the non-shifting surface region by inflation or deflation of the flexible deformable bladder.

* * * * *